United States Patent
Luft

[15] 3,675,966
[45] July 11, 1972

[54] ELEVATING COMPARTMENT
[72] Inventor: Robert G. Luft, Wildwood, Ill.
[73] Assignee: International Harvester Company, Chicago, Ill.
[22] Filed: July 7, 1970
[21] Appl. No.: 52,877

[52] U.S. Cl. .............................296/28 C, 180/89, 254/93, 296/35 R
[51] Int. Cl. .............................................B62d 33/06
[58] Field of Search..................296/28 C, 28 A, 23 C, 35 R; 180/89, 77 S; 214/84; 254/45, 93

[56] References Cited

UNITED STATES PATENTS

| | | | |
|---|---|---|---|
| 2,168,062 | 8/1939 | Davey | 296/23 C |
| 3,289,868 | 12/1966 | Miller | 254/45 |
| 2,798,568 | 7/1957 | Zeller | 180/89 |
| 2,306,348 | 12/1942 | Spear | 180/89 |
| 2,778,674 | 1/1957 | Attendu | 296/28 A |
| 3,093,210 | 6/1963 | Picard | 180/89 X |
| 3,391,811 | 7/1968 | Barnes | 180/89 |

FOREIGN PATENTS OR APPLICATIONS

| | | | |
|---|---|---|---|
| 1,053,031 | 12/1966 | Great Britain | 180/89 |

*Primary Examiner*—Benjamin Hersh
*Assistant Examiner*—John A. Pekar
*Attorney*—Floyd B. Harmon

[57] ABSTRACT

An elevating compartment having a piston rod connected at each end with the vehicle frame. A single acting cylinder reciprocably mounted upon the piston rod and secured to the compartment so that raising and lowering of the cylinder relative to the rod will affect raising and lowering of the compartment. A guide means is provided on the vehicle frame and engageable by guide rollers on the compartment to maintain the compartment in its intended position relative to the vehicle frame.

7 Claims, 5 Drawing Figures

PATENTED JUL 11 1972 3,675,966
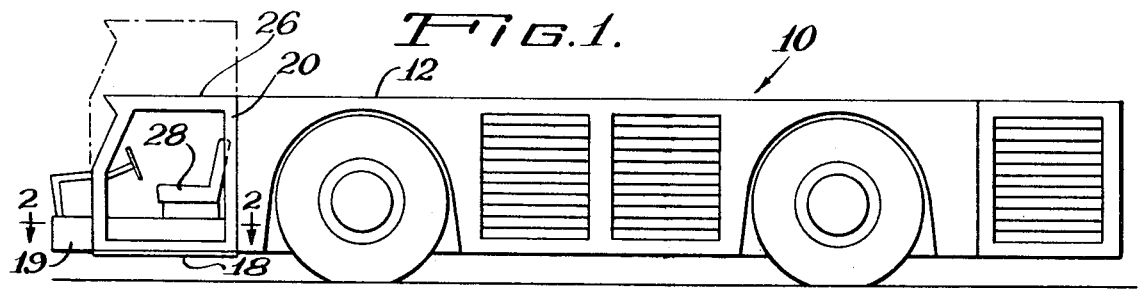
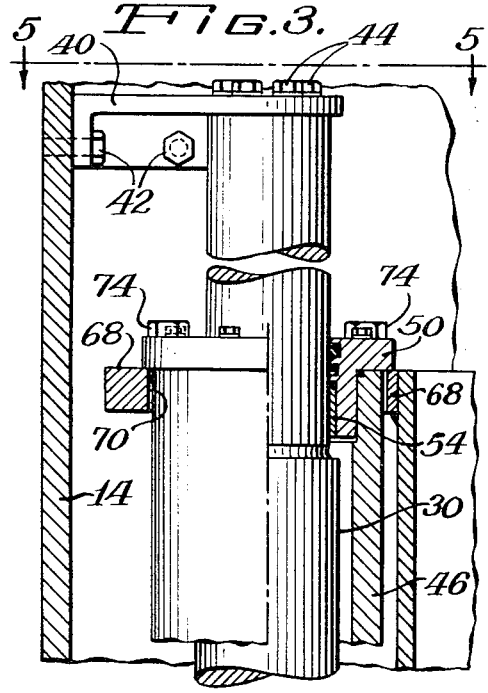
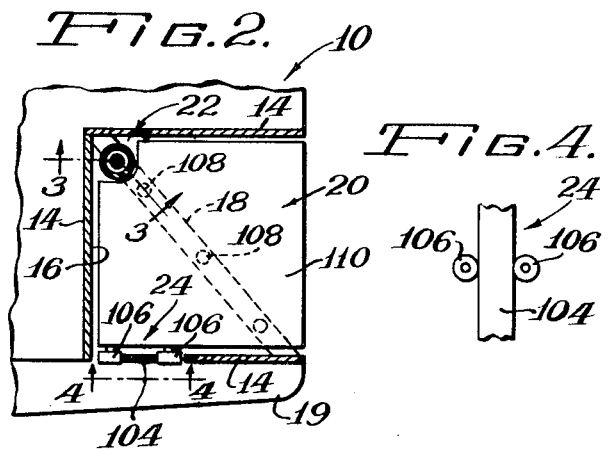
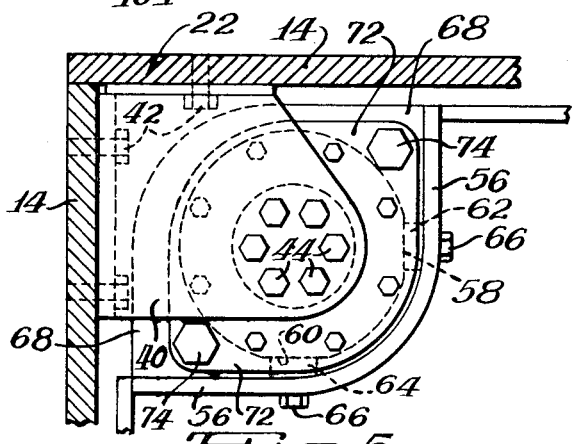
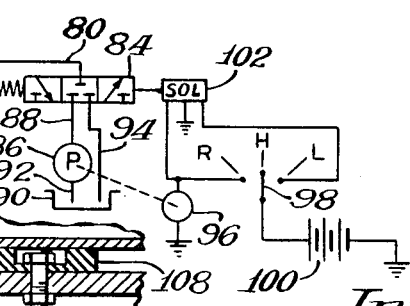
Inventor:
Robert G. Luft
By Ronald C. Kamp Atty.

3,675,966

ELEVATING COMPARTMENT

BACKGROUND AND SUMMARY OF THE INVENTION

In certain large vehicles, such as tow tractors for jumbo jet aircraft, there is a requirement for good visibility for the operator and there is a limitation on the heighth of the vehicle itself. The tow tractor must be capable of being driven underneath the wings of the aircraft without interferring with the wing or any of the appendages which project downward therefrom. Hence, the vehicle must be constructed so that it presents a relatively low silhouette. However, in achieving the low silhouette, the operator is seated so close to the ground that his visibility is restricted. One way of meeting the requirements for a low silhouette and yet providing good visibility for the operator when necessary or desired, is to provide an elevating operator's compartment, which when lowered fulfills the requirement for a low silhouette for the vehicle and which when raised provides the operator with a view of the external dimensions of the vehicle.

It is therefore an object of the present invention to provide an elevating compartment which fulfills the aforementioned requirements, and which is relatively inexpensive to construct and maintain.

It is also an object of the present invention to provide such an elevating compartment in which a single hydraulic cylinder provides both the supporting means and the capability for raising and lowering the compartment.

It is still another object of this invention to provide such an elevating compartment in which maximum utilization of the space allocated for the compartment is achieved.

These, and other objects of the present invention, and many of its attendant advantages, will be readily apparent upon a perusal of the following description and the accompanying drawings wherein:

FIG. 1 is a side elevational view of a vehicle incorporating a compartment of the present invention;

FIG. 2 is a cross sectional view taken on line 2—2 of FIG. 1;

FIG. 3 is a cross sectional view taken on line 3—3 of FIG. 2;

FIG. 4 is a cross sectional view, with portions broken away and eliminated, taken on line 4—4 of FIG. 2; and FIG. 5 is a top plan view taken on line 5—5 of FIG. 3.

DESCRIPTION OF A PREFERRED EMBODIMENT

Referring now to FIG. 1, there is shown a wheeled vehicle, indicated generally at 10, having a flat upper surface 12 capable of functioning as a work deck. The frame of the vehicle 10 includes a frame portion 14 which defines a cavity 16 generally rectangular in plan view, as shown in FIG. 2. A U-shaped channel 18 is secured to the underside of the frame portion 14 and extends diagonally from the inner rear corner of the cavity 16 to the outer front corner thereof. One function of the channel 18 is to provide reinforcement and bracing for the left front corner of the bumper 19 on the vehicle 10. A cab 20, having a plan configuration generally complementary to the cavity 16, is positioned within the cavity 16 and is capable of being raised and lowered by an elevating and supporting means, indicated generally at 22. An alignment means, indicated generally at 24, serves to maintain the cab 20 within the confines of the cavity 16. In its lowered position, the upper surface 26 of the cab 24 is generally coextensive with the upper surface 12 of the vehicle 10 and in its elevated position, as shown by dotted lines in FIG. 1, the cab is raised above the surface 12 to afford an operator sitting on the seat 28 within the cab 20 a good view of the extremities of the machine and the adjacent terrain through windows provided in the cab.

The supporting and elevating means 22 comprises a rod 30 extending substantially vertically along the inner rear corner of the cavity 16. The rod 30 has a lower portion 32 having a projection 34 which rests within a hole 36 in the U-shaped channel 18. The upper portion 38 of the rod 30 is of a reduced diameter. A bracket 40 is secured to the frame portion 14 by means of cap screws 42 and to the upper surface of the rod portion 38 by means of cap screws 44. The bracket 40 not only positions and restrains the upper portion of the rod 30, but also assures that the projection 34 on the lower portion 32 will remain within the hole 36 in the U-shaped channel 18. A cylinder 46 is provided at its lower end with an end fitting 48 which is secured to the cylinder and is in sealing engagement with the lower portion 32 of the rod 30. A similar end fitting 50 is provided at the upper end of the cylinder 46 and sealingly engages the upper portion 38 of the rod 30. A pair of bushings 52 and 54 are provided in the end fittings 48 and 50 respectively in order to resist the bending moment imposed upon the rod 30 by the weight of the cab 20. Since the end fitting 50 must always remain in engagement with the upper portion 38 and the lower fitting 48 in engagement with the lower portion 32 the length of the upper and lower portions 38 and 32 must have a length at least as great as the stroke of the cylinder, i.e., the maximum movement of the cylinder 30 which would correspond with the maximum change in elevation of the cab 20.

The cab 20 is provided with a wall 56 which curves around the cylinder 46 and substantially encompasses approximately 180° of the cylinder's circumference. The lower fitting or gland 48 is provided with a pair of flat surfaces 58 and 60 arranged at 90° with respect to each other. A pair of spacer blocks 62 and 64 are provided to mate with the surface 58 and 60, respectively, and cap screws 66 extend through aligned holes in the wall 56 and the spacer blocks 62 and 64 to engage threaded openings in the lower gland 48. This serves to secure the lower end of the cab 20 to the lower end of the cylinder 46. A support plate 68 is secured to the upper end of the wall 56 and extends substantially perpendicular thereto. The plate 68 has a hole 70 through which the cylinder 46 may be inserted. The upper fitting or gland 50 is provided with outwardly projecting ears 72, which ears project over and engage the plate 68. Cap screws 74 extend through the ears 72 and threadedly engage tapped holes in the plate 68 to secure the upper portion of the cylinder 46 to the wall 56.

The cylinder 46 is of the single-acting or one way type. Elevation of the cylinder 46 is achieved by admitting hydraulic fluid under pressure through an opening 76 in the cylinder wall. The hydraulic pressure, having a larger area on the upper fitting or gland 50 relative to the area against which it may act on the lower gland 48, will cause the cylinder to be raised. Lowering of the cylinder is then achieved by permitting the hydraulic fluid to be exhausted through the opening 76, thereby permitting the weight of the cab to force the cylinder 46 downward.

An electrohydraulic circuit, indicated generally at 78, is provided to control the flow of hydraulic fluid into and out of the opening 76. A conduit 80 connects with the opening 76 and extends through an opening 82 in the wall 56. Conduit 80 connects with a pre-positioned close-center valve 84. A pump 86 connects with the valve 84 through conduit 88 and with a reservoir 90 through conduit 92. A return conduit 94 communicates with the valve 84 and the reservoir 90. The valve 84 is spring biased to its center neutral position in which all three of the conduits 80, 88 and 94 are blocked. The pump 86 is driven by an electrical motor 96. The motor 96 is actuated by movement of the momentary contact switch 98 to the raised position, as indicated by the letter R, which establishes electrical contact between a battery 100 and the motor 96. The switch 98 also establishes electrical contact between the battery 100 and the solenoid 102, which when so energized shifts the valve 84 to the left as viewed in FIG. 3 wherein the conduit 94 is blocked and fluid communication is established between the conduits 80 and 88. Under such conditions, the electric motor 96 will be driving the pump 86 and the output from the pump will be directed through the conduits 88 and 80, and through the opening 76 into the cylinder 46. When the switch 96 is moved to the lower position, as indicated by the letter L in FIG. 3, electrical contact will be established between the battery 100 and the solenoid 102 in order to shift the valve 84 to the right as viewed in FIG. 3, wherein the conduit 88 is blocked and fluid communication is established between the conduits 80 and 94. Whenever the switch 98 is released, it will return to the hold or H position in which the solenoid is deenergized permitting the spring biased valve 84 to return to its center neutral position in which the conduit 80 is blocked, thereby hydraulically locking the cylinder in its given position. The momentary contact type switch for the switch 98 is preferred for aircraft tow tractors because it requires the operator's attention during elevation. This is particularly desirable when the cab is being elevated with the vehicle located in close proximity to the wing of the aircraft. It is also preferred that the entire electrohydraulic circuit 78 be physically located on the elevating compartment 20 so that it reciprocates with the compartment. Such an arrangement would not require a connection between an elevating cylinder and a stationary pump or valve. Obviously, a break in the conduit 80 would permit the cab 20 to be suddenly dropped. Placement of at least the hydraulic portion of the circuit on the cab minimizes the possibility of this occurring. When the battery 100 may be located on the vehicle 10 itself rather than in the cab 20, a flexible connection would be required, but then a failure of the electrical connection between the battery and the switch 98 on the cab would only result in inoperability of the motor 96 and the solenoid 102.

While the elevating and support means 22 does support the entire weight of the cab 20, there is nothing to restrain the cab from pivoting about the axis of the rod 30. The alignment means 24 assures that the cab maintains its proper alignment within the cavity 16. As shown in FIGS. 2 and 4, the frame portion 14 is slotted to define a guide rail 104. A pair of rollers 106 are rotatably mounted on the cab 20 and function as follower means by engaging the opposite surfaces of the guide rail 104. This engagement of the guide rail 104 by the rollers 106 assures that there will be no rotation of the cab 20 about the axis of the rod 30.

In order to cushion the cab 20 as it reaches the terminal portion of its descent, a plurality of yieldable cushion means 108, which may be rubber bumpers, are secured to the channel 18. These bumpers are engaged by the floor 110 of the cab as it reaches its lowermost position.

While a preferred embodiment of the present invention has been disclosed herein, it is to be understood that various changes and modifications may be made without departing from the scope of the invention as defined by the appended claims.

What is claimed is:

1. A means for supporting and elevating a cab on a vehicle having a frame comprising:
    a rod, having a lower portion and a reduced diameter upper portion, secured at each end to the vehicle frame;
    a cylinder having upper and lower ends reciprocably mounted on the rod means and secured to the cab;
    said rod projecting beyond and sealingly engaged on said upper portion by the upper end of the cylinder and on the lower portion by the lower end of the cylinder;
    guide means secured to one of the cab and the vehicle frame; and
    follower means carried by the other one of said cab and said frame and engageable with the guide means.

2. In a vehicle having a relatively flat upper surface and a frame which defines a cavity, the improvement comprising:
    a cab having a shape generally complementary to the frame cavity;
    a single rod means, having a lower portion and a reduced diameter portion, secured at both ends to the vehicle frame and extending substantially upright along one corner of the cavity;
    a cylinder reciprocably mounted on the rod means, said rod means projecting beyond and sealingly engaged on the lower portion by one end of the cylinder and on the reduced diameter portion by the other end of the cylinder;
    means securing the cab to the cylinder for movement therewith, the upper surface of the cab being substantially coextensive with the upper surface of the vehicle when the cylinder is at its lowest position;
    and means to prevent rotation of the cylinder on the rod means.

3. The invention according to claim 2 and further comprising:
    a hydraulic circuit including an electrically driven pump and solenoid valve means mounted on the cab and connected with the cylinder.

4. The invention according to claim 2, and further comprising:
    cushioning means interposed between the bottom of the cab and the frame to decelerate the cab as the cylinder reaches its lowest position.

5. The invention according to claim 2, wherein;
    each of said lower portion and reduced diameter portion has a length at least as great as the maximum change in elevation of the cab.

6. The invention according to claim 3, wherein the cylinder is single acting, and further comprising:
    electrical switch means movable to a raise position in which the electrically driven pump is actuated and said solenoid valve means is shifted to permit the pump output to be directed to the cylinder, and a lower position in which the solenoid valve is shifted to permit the weight of the cab to force hydraulic fluid out of the cylinder.

7. In a vehicle having a frame defining a cavity and having a relatively flat upper surface; the improvement comprising:
    rod means having a lower portion and a reduced diameter upper section secured to the frame in one corner of the cavity;
    a single acting cylinder reciprocably mounted on the rod means and having one end in sealing engagement with the lower portion and the other end in sealing engagement with the upper portion;
    a cab having a shape complementary to the cavity secured to the cylinder, the upper surface of the cab being flush with the upper surface of the vehicle when the cylinder is reciprocated to its lowest position;
    hydraulic circuit means carried by the cab and including an electrically driven pump, solenoid valve means and a reservoir connected with the cylinder;
    said solenoid valve having a spring-biased closed center neutral position in which the cylinder is locked in position and a first shifted position in which communication is established between the pump and the cylinder and a second shifted position on which communication is established between the cylinder and the reservoir;
    an electrical switch means having momentary contact raise and lower positions, the raise position providing electrical contact for actuating the pump and simultaneously shifting the solenoid valve means to its first position, and the lower position providing electrical contact for shifting the solenoid valve means to its second position;
    guide means on the vehicle;
    and follower means on the cab engageable with the guide means for maintaining the cab in a given relationship to the cavity.

* * * * *